United States Patent [19]

Frazier

[11] 4,085,704
[45] Apr. 25, 1978

[54] ANIMAL LITTER
[75] Inventor: Stephen E. Frazier, Orlando, Fla.
[73] Assignee: Rush-Hampton Industries, Longwood, Fla.
[21] Appl. No.: 746,020
[22] Filed: Nov. 30, 1976
[51] Int. Cl.² .............................................. A01K 29/00
[52] U.S. Cl. ....................................................... 119/1
[58] Field of Search ............................................ 119/1
[56] References Cited
U.S. PATENT DOCUMENTS

| | | | |
|---|---|---|---|
| 2,895,873 | 7/1959 | Sawyer, Jr. et al. | 119/1 |
| 3,029,783 | 4/1962 | Sawyer, Jr. et al. | 119/1 |
| 3,636,927 | 1/1972 | Baum | 119/1 |
| 3,675,625 | 7/1972 | Miller et al. | 119/1 |
| 3,921,581 | 11/1975 | Brewer | 119/1 |

*Primary Examiner*—Hugh R. Chamblee

[57] ABSTRACT

An improved animal litter is disclosed which slowly, continuously and uniformly releases an odor control agent, comprising a suitable absorbent material admixed with a vehicle which has been previously impregnated with an odor control agent. A method for imparting long lasting, continuous, uniform, slowly released odor controlling properties to any suitable absorbent material is also disclosed.

16 Claims, No Drawings

ANIMAL LITTER

BACKGROUND OF THE INVENTION

This invention relates to an improved animal litter and a process for producing odor absorbing or odor masking agents in general.

A wide variety of products have been proposed for use in animal litters. Such products include clay, bentonites, fuller's earth, vermiculite and diatomaceous earth in various forms and combinations, all of which are characterized by a relatively high surface area and high moisture absorbency.

Though the various prior art products exhibit a characteristically high affinity for moisture, they have been found to be generally ineffective to quickly overcome or neutralize the strong odors produced by urine and the fecal material of animals using the litter. Consequently, various deodorizing and odor masking additives have been incorporated in the absorbent material for the purpose of masking or neutralizing such odors. Although such materials function effectively for short periods of time, it has been found that the prior art animal litters, in general, require frequent changing in order to prevent or to effectively mask objectionable odors in the litter.

In particular, the addition of various odor control agents to mask the odors emanating from animal wastes has been found to be generally ineffective due to the tendency of the odor control agent to volatilize when the litter is in continuous use for prolonged periods of time.

It has also been proposed, as for instance in U.S. Pat. No. 3,675,625, to heat-treat a high density absorbent material such as diatomaceous earth or fuller's earth and to thereafter mix the heat-treated absorbent material with an odor control agent. In such products, however, no discernible odor control agent is released until the litter material is contacted with water.

In accordance with the present invention an effective and improved animal litter is provided which can be used for prolonged periods of time. The animal litter of the present invention produces a continuous, long lasting, uniform, slowly released odor control agent. The present invention also provides a method for imparting continuous, long lasting, uniform, slowly released odor control properties to any suitable absorbent material.

SUMMARY OF THE INVENTION

It has now been discovered that a continuous, long lasting, uniform, slowly released odor control agent may be imparted to a suitable absorbent material by a method which involves the steps of impregnating a suitable vehicle or carrier with an odor control agent, admixing the vehicle impregnated with an odor control agent with the absorbent material and thereafter storing the product in a closed container until the odor control agent is uniformly distributed, in the vapor phase, throughout the whole sample. The product may be used without further processing, or it may be further diluted by mixing with additional absorbent material.

Suitable vehicles or carriers for the odor control agent must be of high porosity, chemically inert, and not subject to degradation when soaked with large amounts of the odor control agent. Particularly preferred vehicles are grades of silica gel and mullite possessing these properties.

DESCRIPTION OF PREFERRED EMBODIMENTS

The absorbent materials of the present invention include substantially all materials having the requisite characteristics of high surface area and high moisture absorbency. Absorbent materials which may be used include inorganic absorbents such as clay, vermiculite, zeolite molecular sieves, opalite, silica materials, fire brick, or earthen materials such as diatomaceous earth or fuller's earth.

The odor control agent vehicle or carrier of the present invention must be of high porosity and not subject to degradation when contacted with large amounts, e.g., more than 40 weight percent of the odor control agent. Many absorbent materials, particularly earthen materials such as clay and diatomaceous earth, degrade and form mud like mixtures when contacted with large amounts of odor control agent. Thus such materials are not suitable for use as vehicles or carriers in the present invention.

Other highly absorbent materials, such as zeolites, are insufficiently chemically inert for use as odor control agent carriers. These materials promote oxidation or other reactions of the odor control agents, thereby lessening the effectiveness and life of the agents.

Silica gel and mullite pellets are available in forms which are highly porous, chemically inert (e.g., won't promote reactions of the odor control agents), and won't degrade when contacted with large amounts of odor control agent. Accordingly silica gel and mullite having these characteristics are the preferred odor control agent vehicle or carrier. It is understood that as used herein, the terms silica gel and mullite refer to forms of these materials having the desired characteristics.

In the practice of the invention it has been found that silica gel is particularly suitable for use as a vehicle for the odor control agent. Silica gel is an amorphous form of silica made by substantially dehydrating the jelly-like precipitate resulting from acidification of sodium silicate with sulfuric acid. It is characterized by its extreme capillarity, the capillary pores occupying approximately 50% of its specific volume. Its utility as a desiccant is well known, as disclosed in the *McGraw-Hill Encyclopedia of Science and Technology*, Vol. 4, page 77 (1966 Ed.). Commercial grades are supplied in a variety of mesh sizes that are suitable for use in the instant invention.

A wide range of odor control agents may be used in the present invention, including any commercially available perfumes, flavors, fragrances, and essence oils. Specific examples of suitable odor control agents include lemon oil, lime oil, orange oil, oil of cloves, cinnamon oil, apple fragrance, honeysuckle fragrange, pine oil, methol, camphor, and various types of phenolic materials.

As previously discussed, the process of the invention includes the steps of impregnating a silica gel of mullite vehicle with an odor control agent. Impregnation is achieved by simply admixing the vehicle and the odor control agent, thus adsorbing and absorbing the odor control agent into the vehicle so that the impregnated vehicle is essentially in the form of dry discrete particles which are subsequently mixed with the absorbent material. The ratio of odor control agent to vehicle will vary depending upon the particular odor control agents employed and the strength of the fragrance or odor control properties desired in the final product. Generally, the ratio of odor control agent to vehicle should be from about 1% to about 50% by weight of odor control agent to vehicle. A more preferred range is from about 40% to about 50% by weight of odor control agent to vehicle.

The vehicle which has been impregnated with the fragrance is then admixed with a suitable absorbent material. Absorbent materials which may be used include substantially all those materials having the requisite characteristics of high surface area and absorbency as recited hereinabove. As with the ratio of odor control agent to vehicle, the ratio of impregnated vehicle to absorbent material will vary depending upon the particular odor control agents employed and the strength of the fragrance or odor control properties desired in the final product. It has been found generally that the ratio of impregnated vehicle to absorbent material may be from about 1% to about 50% by weight of vehicle to absorbent material. The most preferred range is from about 10% to about 30% of impregnated vehicle to absorbent material.

After mixing, the resultant composition is placed in a closed container for a sufficient period to time to allow the odor control agent to be uniformly mixed throughout the entire sample. Typically, a period of 24 hours to two weeks is sufficient for the uniform mixing of the fragrance, but this time period will depend upon the characteristics of the fragrance, fragrance vehicle, and absorbent material in each instance. It has been found that optimum results may be achieved when a time period of from three to six days is employed.

The resultant product may be used directly without further processing, or it may be further diluted by mixing with additional absorbent material in an amount up to about 50 times the original weight of the product of the storage step. A more preferred range is from about 20 to about 40 times more weight of absorbent. The amount of additional absorbent material that may be added will also depend upon the strength of odor control properties desired in the ultimate product.

EXAMPLE I

In a typical example, 40 lbs. of impregnated silica gel, made by mixing 19 lbs. of commercially available apple fragrance with 21 lbs. of silica gel (Grace, grade 59), was added to 160 lbs. of 3 to 8 mesh fuller's earth, thoroughly mixed and placed in a 200 lb. capacity fiber drum. After standing for 4 days, the fragrance was uniformly mixed throughout the whole sample. The resultant material exhibited a continuous, long lasting, uniform, slowly released fragrance, and may be used directly in a variety of applications, including, but not limited to an animal litter.

Alternatively, based upon economic considerations and the strength of fragrance desired in the final product it may be diluted by the addition of from 50 to 6000 lbs. of fuller's earth. This product also exhibits a continuous, slowly released fragrance that may be used directly in a variety of applications, including, but not limited to, an animal litter.

EXAMPLE II

Example I was repeated except that compressed orange oil was used as a fragrance instead of apple fragrance.

EXAMPLE III

Example I was repeated except that honeysuckle fragrance was used instead of apple fragrance.

EXAMPLE IV

Example I was repeated except that pine oil was used as a fragrance instead of applied fragrance. E

EXAMPLE V

Example I was repeated except that lemon oil was used as a fragrance instead of apple fragrance.

It should be understood that the product of the instant invention which has the aforementioned properties is useful as an animal litter for a variety of animals including cats, dogs, hampsters, gerbils, rats and other like domesticated animals. The improved product of the instant invention is also useful for domesticated birds or other pets such as reptiles. Obviously, the invention will be useful in numerous additional applications which will be obvious to those skilled in the art.

What is claimed is:

1. An animal litter which slowly, continuously and uniformly releases an odor control agent comprising a suitable absorbent material admixed with from about 1% to about 50% by weight of a highly porous, chemically inert silica gel or mullite vehicle which has been previously impregnated with from about 1% to about 50% by weight of an odor control agent.

2. An animal litter as set forth in claim 1, wherein said vehicle is silica gel.

3. An animal litter as set forth in claim 2, wherein said odor control agent is a perfume, flavor, fragrance, or essence oil.

4. An animal litter as set forth in claim 3, wherein said odor control agent is selected from the group consisting of lemon oil, lime oil, orange oil, oil of cloves, cinnamon oil, apple fragrance, honeysuckle fragrance, pine oil, menthol and camphor.

5. An animal litter as set forth in claim 1, wherein said absorbent material is an inorganic absorbent selected from the group consisting of clay, vermiculite, zeolite, opalite, silica materials, fire brick, diatomaceous earth and fuller's earth.

6. An animal litter as set forth in claim 5, wherein said absorbent material is fuller's earth.

7. The animal litter of claim 5, wherein said absorbent material has a particle size of 3 to 8 mesh.

8. An animal litter which slowly, continuously and uniformly releases an odor control agent comprising an absorbant material selected from the group consisting of clay and fuller's earth admixed with from about 10% to about 30% by weight of a highly porous, chemically inert silica gel vehicle which has been previously impregnated with from about 40% to about 50% by weight of an odor control agent.

9. An animal litter as set forth in claim 8 which has been diluted with up to about 50 times by weight with additional absorbent material.

10. An animal litter as set forth in claim 9 which has been diluted with from about 20 to about 40 times by weight with additional absorbent material.

11. A method for imparting long lasting, uniform, slowly released odor controlling properties to an absorbent material by impregnating a highly porous, chemically insert silica gel or mullite vehicle with from about 1% to about 50% by weight of an odor control agent, admixing the impregnated silica gel vehicle with said absorbent material, in an amount of about 1% to about 50% by weight of impregnated silica gel vehicle to absorbent material, and thereafter storing the product in a closed container until the odor control agent is uniformly distributed in the vapor phase throughout a product material.

12. A method as recited in claim 11 which involves the additional step of diluting said product material by the mixing of said product material with up to about 50 times by weight of additional absorbent material.

13. A method as recited in claim 11 wherein said absorbent material is selected from the group consisting of clay, vermiculite, zeolite, opalite, silica material, fire brick, diatomaceous earth, and fuller's earth.

14. A method for imparting long lasting, uniform, slowly released odor controlling properties to an absorbent material selected from the group consisting of clay and fuller's earth by impregnating a highly porous, chemically insert silica gel vehicle with from about 40% to about 50% by weight of an odor control agent, admixing the impregnated silica gel vehicle with said absorbent material in an amount of about 10% to about 30% by weight of impregnated vehicle to absorbent material, and thereafter storing the product in a closed container for about 3 to 6 days, thereby uniformly distributing the odor control agent in the vapor phase throughout a product material.

15. A method as recited in claim 14 which involves the additional step of diluting said product material with about 20 to about 40 times by weight of additional absorbent material.

16. A method as recited in claim 14 in which said odor control agent is selected from the group consisting of apple fragrance, compressed orange oil, lime oil, oil of cloves, cinnamon oil, methol, honeysuckle, pine oil and lemon oil.

* * * * *

UNITED STATES PATENT AND TRADEMARK OFFICE
CERTIFICATE OF CORRECTION

PATENT NO. : 4,085,704
DATED : April 25, 1978
INVENTOR(S) : Stephen E. Frazier

It is certified that error appears in the above-identified patent and that said Letters Patent are hereby corrected as shown below:

The title of the invention should be

--PROCESS FOR PRODUCING ODOR ABSORBING OR ODOR MASKING AGENTS AND ANIMAL LITTER PRODUCED THEREBY--

Claim 11, column 4, line 66, "insert" should be --inert--.

Claim 14, column 5, line 19, "insert" should be --inert--.

Signed and Sealed this

Third Day of July 1979

[SEAL]

Attest:

*Attesting Officer*

LUTRELLE F. PARKER
*Acting Commissioner of Patents and Trademarks*